(12) United States Patent
Tarbell (10) Patent No.: US 10,790,648 B2
(45) Date of Patent: Sep. 29, 2020

(54) WIRE GRIPPING AND STRIPPING TOOL AND METHOD OF USING SAME

(71) Applicant: Nonconductive Tool Company, LLC, Torrance, CA (US)

(72) Inventor: Warren Tarbell, Torrance, CA (US)

(73) Assignee: NONCONDUCTIVE TOOL COMPANY, LLC, Torrance, CA (US)

( * ) Notice: Subject to any disclaimer, the term of this patent is extended or adjusted under 35 U.S.C. 154(b) by 199 days.

(21) Appl. No.: 15/975,674

(22) Filed: May 9, 2018

(65) Prior Publication Data

US 2018/0331519 A1 Nov. 15, 2018

Related U.S. Application Data

(60) Provisional application No. 62/503,890, filed on May 9, 2017.

(51) Int. Cl.
| | | |
|---|---|---|
| *H02G 1/12* | (2006.01) | |
| *B25B 33/00* | (2006.01) | |
| *B25F 1/00* | (2006.01) | |
| *B25B 25/00* | (2006.01) | |
| *B25B 7/22* | (2006.01) | |
| *B25B 7/02* | (2006.01) | |

(52) U.S. Cl.
CPC ........... *H02G 1/1212* (2013.01); *B25B 25/00* (2013.01); *B25B 33/00* (2013.01); *B25F 1/00* (2013.01); *B25B 7/02* (2013.01); *B25B 7/22* (2013.01)

(58) Field of Classification Search
CPC ...... H02G 1/1212; B25B 25/00; B25B 33/00; B25B 7/02; B25B 7/22; B25F 1/00

USPC ........................................................... 81/9.4
See application file for complete search history.

(56) References Cited

U.S. PATENT DOCUMENTS

| | | | | |
|---|---|---|---|---|
| 228,516 | A * | 6/1880 | Crocker ................. | B23D 27/02 30/241 |
| 2,191,010 | A * | 2/1940 | Dahlquist ......................... | 81/44 |
| 3,484,940 | A * | 12/1969 | Zell, Jr. ................... | B26B 29/02 30/162 |
| 5,203,083 | A * | 4/1993 | Domonoske ........... | B23D 21/10 30/162 |
| 5,956,789 | A * | 9/1999 | Chou ...................... | B25B 15/00 30/90.1 |
| 6,029,297 | A * | 2/2000 | French ..................... | B25B 7/22 7/107 |

(Continued)

*Primary Examiner* — Hadi Shakeri
(74) *Attorney, Agent, or Firm* — Sheppard, Mullin, Richter & Hampton LLP (57) ABSTRACT

Embodiments disclosed herein include devices and methods for gripping and stripping an electrical wire. The tool may include a body, having a first portion with a curved tip, and a second portion. The tool may also include a closing mechanism mounted on the body, and an elongated member having a protruding tip and coupled to the closing mechanism. The elongated member can slidably move towards the second portion, causing the protruding tip to move away from to the curved tip, with respect to movement of the closing mechanism for receiving at least a portion of an electrical wire inserted into the opening, or move towards the first portion, causing the protruding tip to move toward the curved tip, with respect to another movement of the closing mechanism for gripping the received portion of the electrical wire.

11 Claims, 6 Drawing Sheets

(56) References Cited

U.S. PATENT DOCUMENTS 6,126,217 A * 10/2000 Guadiana .................. B25B 9/00
294/24

* cited by examiner

FIG. 7

WIRE GRIPPING AND STRIPPING TOOL AND METHOD OF USING SAME

CROSS-REFERENCE TO RELATED APPLICATIONS

This application claims the benefit of U.S. Provisional Patent Application Ser. No. 62/503,890, filed May 9, 2017. This application hereby incorporates herein by reference, the complete contents of the above referenced United States Provisional Patent Application, in its entirety.

TECHNICAL FIELD

The disclosed technology relates generally to electrical tools, and more particularly, some embodiments relate to a tool usable to grip a wire and strip the insulation from the wire, and methods of using the same.

DESCRIPTION OF THE RELATED ART

Electrical workers are often considered to be engaged in a very dangerous profession. Electrical workers are tasked with working on high voltage, high current electrical circuits. Although electrical workers take many precautions against the risk of shock, accident still occur. Miswiring of the circuit or mislabeling of junction boxes and components can cause an electrician to be exposed to a live circuit even after he or she has taken reasonable steps to turn off the circuit. To exacerbate this problem, electrical workers are often required to manipulate electrical components with their hands or with metal tools. For example, to pull an electrical socket out of a wall box, electricians often use their hands. Consequently, they might accidentally touch the electrical posts carrying electricity to the socket. Furthermore, electrical components, for example wires and terminals, may unintentionally come into contact with other electrical devices, or junction boxes, while the device is being installed in or removed. Accidental contact between conductors can cause various hazardous conditions, such as an arc fault, which is a high-power discharge of electricity that can translate into heat and potentially trigger an electrical fire.

BRIEF SUMMARY OF EMBODIMENTS

According to various embodiments of the disclosed technology, a wire gripping and stripping tool is described. According to one embodiment, the wire gripping and stripping tool may include: a body, wherein the body comprises a first portion having a curved tip, and a second portion; a closing mechanism mounted on the body; and an elongated member having a protruding tip and coupled to the closing mechanism, wherein the elongated member slid ably moves towards the second portion, causing the protruding tip to move away from to the curved tip, with respect to movement of the closing mechanism to increase an opening of the curved tip for receiving at least a portion of an electrical wire inserted into the opening, and the elongated member slidably moves towards the first portion, causing the protruding tip to move toward the curved tip, with respect to another movement of the closing mechanism to decrease the opening of the curved tip for gripping the received portion of the electrical wire.

Other embodiments may include a cutting blade coupled to the elongated member, wherein the cutting blade slidably moves towards the second portion with respect to the movement of the closing mechanism to decrease a space between the cutting blade and a fixed cutting blade to cut through an additional portion of the electrical wire.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "front," "back," "bottom" or "side" views, such references are merely descriptive and do not imply or require that the disclosed technology be implemented or used in a particular spatial orientation unless explicitly stated otherwise.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward a devices and methods for operation relating to an electrical wire, such as gripping a wire and stripping insulation from the electrical wire.

Embodiments can be configured to include a main elongated body member, with a first section, namely a slide housing body structured to impart slidable movement on some element of the tool. A second section of the main body, which is a handle body, can include a contoured grip allowing a human to grip the tool by-hand. The embodiment can also be described as a main body with first and second ends (relative to a length of the tool), and an elongated center portion. The first and second ends (or the first and second sections) can each have a wire gripping mechanism, such as hook constructed at the front tip of the tool and rear hook at the tool's rear end.

The tool is dimensioned such that the body can accept an elongated member, which is capable of slidable movement with respect to a movement of a closing mechanism. In some embodiments, the closing mechanism is a thumb slide, that can be manipulated by a thumb, or other digit, to slidably extend the elongated member toward the first end of the tool. Accordingly, the elongated member, in conduction with hook at the tip of the tool, can grip a wire resting in the hook. Moreover, one end of the tool can include a wire stripper. The wire stripper can have a blade that is also is moveably coupled to the closing mechanism, allowing the closing mechanism to be slid forward, for example, to cause the blade to move in a manner cutting through the wire insulation.

Figure 1:
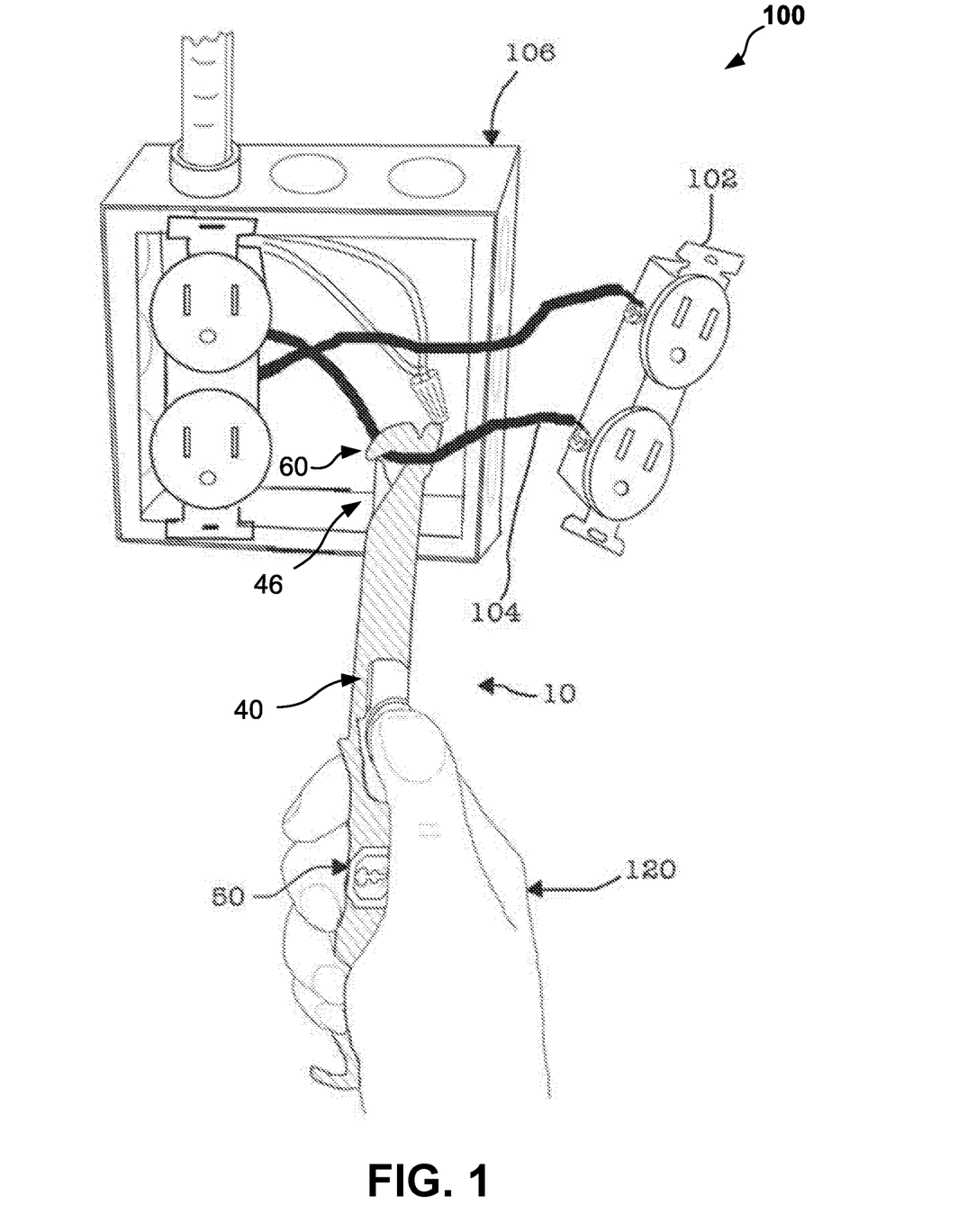
FIG. 1 is a diagram illustrating an example wire gripping and stripping tool in accordance with one embodiment of the technology described herein.

FIG. 1 is a diagram illustrating an example wire gripping and stripping tool 10 in accordance with one embodiment described herein. As shown, FIG. 1 illustrates an example environment 100 relating to electrical components, where electrical wiring may be present for operating tool 10. In this example, electrical devices can be, for example, an electrical outlet, a receptacle, switch, ground fault circuit interrupters (GFCI), timer, sensor, etc. The illustrated example shows the tool 10 engaging a wire 104 that is attached to an electrical outlet 102. The electrical outlet 102 is removed from a junction box 106 that may have been housing the device (e.g., outside of the enclosure), but remains connected to the wire 104 mainly inside of the junction box 106. Sometimes while removing an electrical device, for example, a human may have to handle relatively small electrical components, such as the circuit's electrical wiring. In this case, a person manually handling wire 104, which may be used to carry electricity to the outlet 102, can lead to potentially dangerous conditions. As an example, an electrician using their hand(s) to touch wire 104 runs the risk of accidental electrical shock, if power is not turned off for the devices in the junction box 106. Employing wire gripping and stripping tool 10, as disclosed herein, to handle the wire 104 can help reduce electrical hazards, such as shorting, arcing, and the like.

The structure of wire gripping and stripping tool 10 may be generally described as a predominately linear (e.g., straight, flat, etc.) and elongated bar (dimensioned to be generally larger in respect to length, as opposed to width). In the illustrated example, the tool 10 can include a main body, with first and second ends that are separated by an elongated center portion. The tool 10 can be configured, such that, one end of the tool 10 (relative to length) can be a section designed for a human to grip the tool 10 by-hand, as shown. At the opposing end of the tool 10, can be elements mainly intended for contact with electrical components, such as wire 104. For purposes of discussion, this end of the tool 10, which includes hook 62, is hereinafter referred to as the front end of the tool 10. The hook 62 can be described as a curved tip of the tool 10, that is bent back at an angle, generally forming a "u" structure for catching hold of a wire 104 at the front end.

It should be appreciated that this arrangement for the tool 10, where the tool's 10 length essentially separates the two ends, can provide a safe distance between a human hand 120 and electrical components, while in use. In some embodiments, the tool 10, and its components, is constructed from non-conductive materials, such as plastic, rubber, rubberlike material, plastics, foams, polymers and the like. To this end, the tool 10 can provide nonconductive effects that may help reduce the risk of hazards associated with handling conductive electrical components, like wire 104.

In the example, FIG. 1 illustrates the wire gripping and stripping tool 10 operating to grip wire 104 in the environment 100. A front view of the tool 10 is shown in reference to an example arrangement of the tool in operation, and hereinafter referred to as the front surface, or face, of the tool 10. In operation, the wire 104 can be received by an open hook head 60 located at a tip of the tool 10, and then securely gripped by the tool 10, as the hook head 60 is closed. By manipulating a closing mechanism 40, the tool 10 can alternate from the hook head 60 being in the open configuration (e.g., to easily receive a wire 104), to the closed configuration to grip the wire 104. According to this example embodiment, tool 10 can include the closing mechanism 40 mounted on top of the front surface of the tool 10. The closing mechanism 40 can be implemented using any mechanical means capable of slid able movement, such that a sliding grip tip 46, in turn, can also be moved (in relation to the hook head 60).

The closing mechanism 40 is a part of the tool 10 that can be moved in a particular direction, for instance being pushed forward by a thumb or other digit of a hand 120. The forward movement of the closing mechanism 40 causes the sliding grip tip 46 to similarly slide forward, until the tip 46 is pushed firmly against the hook head 60. The contact, or "pinching", between the sliding grip tip 46 and hook head 60 effectuates a closing of the hook head 60, and thereby allows the tool 10 to grip the wire 104. While in the grasp of the tool 10, the wire 104 can be repositioned as desired, for instance pushed, pulled, bent, moved in multiple directions, and the like. However, the wire 104 is subject to this manipulation while the human holds the tool 10 in their hand 120, rather than directly touching the wire 104 by-hand and potentially being harmed. Alternatively, the closing mechanism 40 can be slid in an opposite direction, for instance pulled back by the thumb, thus causing the sliding grip tip 46 to move away from the hook 40, which can release the wire 104.

It should be appreciated that in this example environment 100, the wire gripping and stripping tool 10 is also capable of stripping insulation from the wire 104, as further described herein. According to some embodiments, as illustrated in FIG. 1, the tool 10 includes a wire stripper 50 arranged on the front surface to achieve the wire stripping functions. Electrical wires can have a core, or center, of conductive material that is covered with an insulation layer, for example a solid-core copper wire. The tool 10 can be used to cut though the insulation layer of a portion of wire 104. For instance, the tip of wire 104, can be inserted into wire stripper 50, in a manner that removes the insulation to uncover the wire's 104 conductive material. Additionally, the wire stripper 50 may further function as a wire cutter, being capable of slicing through both the insulation layer, and the core of the wire 104.

Figure 2A:
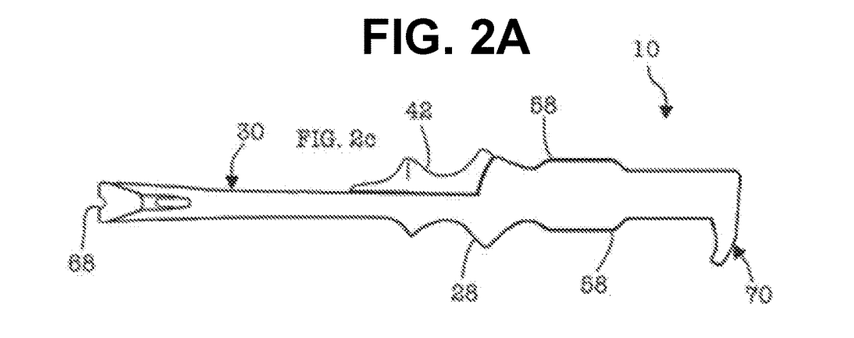
FIG. 2A and FIG. 2F are side views of the example wire gripping and stripping tool illustrated in FIG. 1.
Figures 2B, 2C:
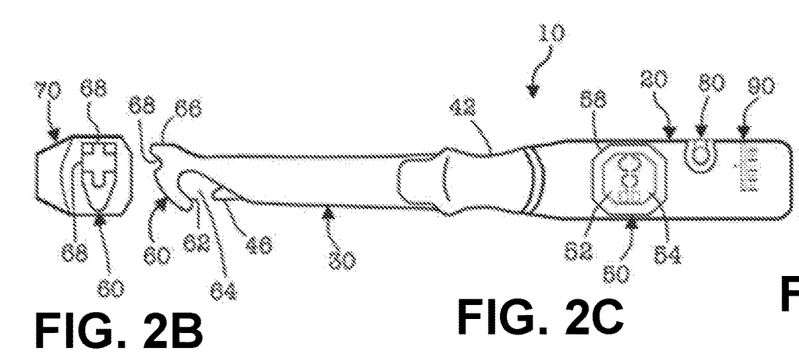
FIGS. 2C and 2E are a top view and a bottom view, respectively, of the example wire gripping and stripping tool illustrated in FIG. 1.
FIG. 2B and FIG. 2D are end views of the example wire gripping and stripping tool illustrated in FIG. 1.
Figure 2D:
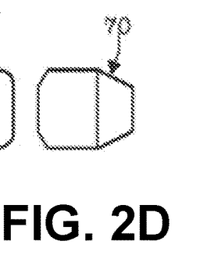
Figure 2E:
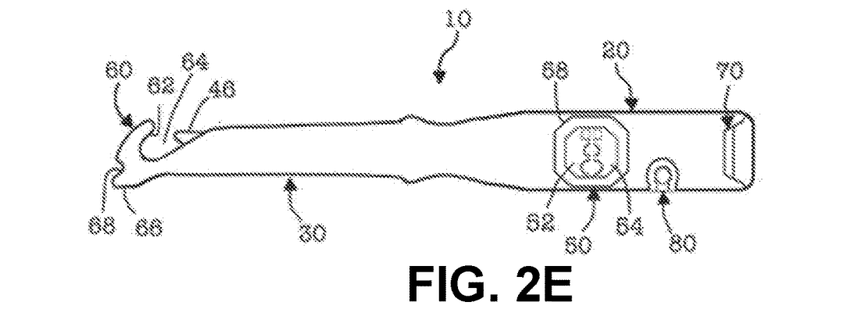
Figure 2F:
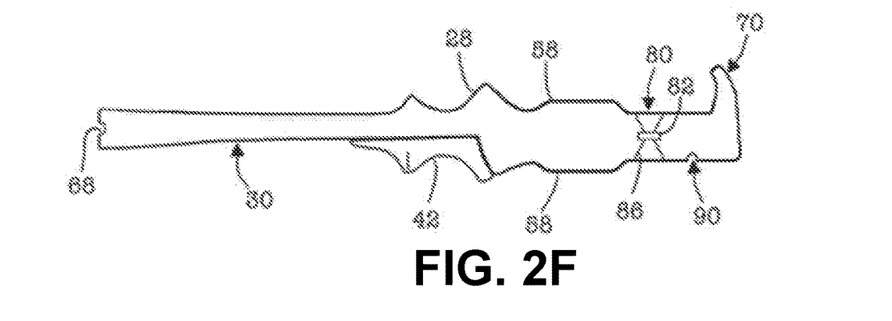

FIGS. 2A-2F are diagrams illustrating multiple views of the example wire gripping and stripping tool 10 shown in FIG. 1. In particular, FIG. 2A and FIG. 2F show opposite side views of the tool 10. FIG. 2B and FIG. 2D show opposite end views of the tool 10. FIG. 2C and FIG. 2E illustrate a top view and a bottom view of the tool 10, respectively. Referring to FIG. 2C, the tool 10 can be described as generally including two sections of the main body, a handle body 20, and a slide housing body 30. In some embodiments, the handle body 20 section and the slide housing body 30 section are approximately halves of the tool 10 (relative to length). In continuing with the example, the slide housing body 30 can be characterized as the front half, including the hook head 60 at the tip the tool 10 for gripping, or otherwise engaging, the wires. Conversely, the handle body 20 comprises the rear half, or back end of the tool 10 which is mainly structured for holding the tool 10 itself.

In this example configuration, both ends of the tool 10 have wire gripping portions that can be used to grip, pull, and twist wires. Referring to FIG. 2E, the handle body 20 includes a rear hook 70. The rear hook 70 can be configured as a radiused tip which protrudes upwards from a rear surface (relative to the face of the tool) of the end of tool 10, such that the rear hook's 70 opening can be used to grip a wire. FIGS. 2A and 2F show side views of the tool 10 that prominently displays the rear hook 70. FIG. 2D also shows an end view of the tool, illustrating an end surface of rear hook 70. In some embodiments, the rear hook 70 is optional. Furthermore, the rear hook 70, may be larger in comparison to hook head 60, and thus may be preferable in scenarios where precision is not as critical. For instance, the rear hook 70 can be used to handle larger gauge wires, or for pulling multiple wires at once.

Referring back to FIG. 2C, the handle body 20 can include various elements that implement the wire stripping functions of the wire gripping and stripping tool 10. In the illustrated example, the tool 10 can include a wire stripper 50 arranged on the face surface of the tool 10, and constructed with blades 52, 54 for cutting through an insulation of the wire. For example, when the tool 10 is held in the opposite direction, a wire can be inserted into a wire insertion bevel guide 58, which is an opening for receiving the portion of the wire intended to be stripped. As discussed in detail in reference to FIG. 1, a closing mechanism can be used to effectuate movement of the sliding grip tip 46 relating to wire gripping features of the tool 10. Additionally, the thumb slide 42 can cause movement of at least one of the blades 52, 54 in the wire stripper 50, in a manner that adjusts a space between the blades 52, 54. Accordingly, moving the thumb slide 42 in a particular direction arranges the wire stripper 50 in either an open or closed position. For instance, when the thumb slide 42 is slid into the forward position, a sliding blade 52 can correspondingly slide away from a fixed blade 54, with respect to the movement of the thumb slide 42. As the space between the blades 52, 54 is increased, the wire stripper section 10 is configured to its open position, and the wire can be received by opening in insertion guide 58. For example, a portion of the wire is inserted into the opening of insertion guide 58, and placed down in the space between the blades 52, 54, to be stripped.

Subsequently, in continuing with the example, the thumb slide 42 can be slidably moved in the opposite direction, or pulled back towards the read end of the tool 10, and causing the blades 52, 54 to come together in a manner that cuts though the wire insulation. Furthermore, with the thumb slide 42 still engaged, the wire and tool 10 can be pulled in opposite directions such that the end of the insulation is removed from the wire, or otherwise stripped. In some embodiments, the tool 10 is constructed with a designated catch area for the removed insulation to be later removed from the tool. In other embodiments, the tool is configured to immediately discard stripped insulation (e.g., falling away from the tool).

Figure 6:
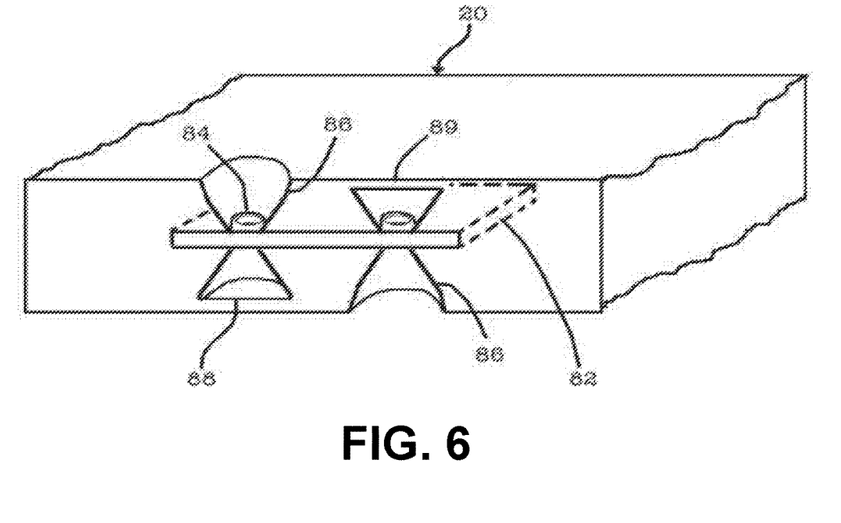
FIG. 6 is a perspective view of a section, including a wire bender, of the example wire gripping and stripping tool illustrated in FIG. 1.

Also shown in FIG. 2C, is a wire bender 80. The elements of the wire bender 80 are further illustrated in FIG. 6. FIG. 6 shows a portion of the handle body 20, prominently illustrating the wire bender 80. According to the embodiments, the wire bender 80 includes a wire bender plate 82 that is encased in the handle body 20 of the tool 10. In the illustrated example, the wire bender plate 82 is arranged parallel to the front surface of the tool 10. In some cases, the wire bender plate 82 is constructed using metal or similarly hard material. There can be one or more wire bender holes 84 in the face surface of the tool 10 that extend down through the width of the metal plate 82. A wire can be inserted into these holes 84, and effectively funneled down through to the internal structure of the tool 10, as guided by wire insertion guide walls 86. The guide walls 86 can be tapered portions within the handle body 20 having a structure like funnels, that can direct a wire in the appropriate direction to reach wire bender plate 82. The view shown in FIG. 2F illustrates that a guide wall 86 can have a larger radius at the tool's 10 external surface that gradually narrows as it leads to the wire bender plate 82 inside of the tool 10. The guide walls 86 can improve the overall function of wire bender 80 by reducing the likelihood of wire misplacement, for example by preventing a wire tip from getting caught on the body of the wire bender plate 82.

In operation, rotating the tool 10, for example a human turning their grip on the handle body 20, can cause the wire to press firmly against the wire bender plate 82 inside of the tool 10. The wire, being malleable in most cases, can bend in a manner that corresponds to the direction and angle of the handle body's 20 rotation. In some embodiments, the wire bender 80 and its components are specifically dimensioned, for example based on the dimensions of another electrical component or for an anticipated application. As an example, the wire bender 80 can be configured to bend at a particular radius to firmly wrap a wire around a screw of an electrical device.

Reference is now made back to FIG. 6. As seen, the wire bender 80 can have a right-hand wire depth stop 88 and/or a left-hand wire depth stop 89 to assist with bending the wire as desired, such as to a radius. In this embodiment, the right-hand wire depth stop 88 and the corresponding wire bender holes 84 are designed for bending with the right hand. Alternatively, the left-hand wire depth stop 89 and its corresponding wire bender holes 84 are designed for bending with the left hand. In some embodiments, the tool 10 can be configured to include wire depth stops, similar to the previously discussed mechanisms, underneath the wire stripper 50. Accordingly, the optional wire depth stops can assist with stripping wires that may have varying dimensions, in a manner that results in standard and uniform lengths.

Referring back to FIG. 2A and FIG. 2F, the illustrated examples show that the handle body 20 can be constructed to include a grip contour 18, designed for a human to grip the wire gripping and clipping tool 10. The exterior surface of the handle body 20 can have curved, ridged, or contoured sections, which comprise the grip contour 18. Thus, the handle body 20 can be shaped for a human to easily place their fingers around the tool 10, in order to improve the grip. To this end, the tool 10 is dimensioned for easy gripping. The improved gripping can further allow a human to more easily provide resistance in manipulating some elements of the tool, for instance remaining stably gripped in-hand as the thumb pushes or pulls on the thumb slide 42.

Referring again to FIG. 2C, the furthermost portion at the front end of the tool 10 can be a tip, or hook head 60, that is constructed as hook 62, and having a surface arranged perpendicular to the face of the tool 10. In the example embodiment, this surface may serve as a wire push groove tip 66. Wire push groove tip 66 is a substantially flat surface that has an indentation, or wire push groove 68, which is a notch in the surface usable to receive a wire. The example in FIG. 2B shows two mainly linear wire push grooves that are perpendicular to each other 68, a generally forming a "t" shaped notch in the wire push groove tip 66. In this configuration, a wire that may be placed against the wire push groove tip 66 can be held inside the wire push groove 68, and as the tool 10 is moved, or pushed, the wire can likewise be pushed into a desired position. As an example, the wire push groove tip 66 can be pressed against a loose wire, such that the wire falls within the wire push groove 66. As the wire rests against the tip 66, the tool 10 can be pushed, for example from gripping of the handle body 20, to assist in pushing the wire back into a junction box.

In FIG. 2C, the example wire gripping and stripping tool 10 has the hook 62 positioned such that its opening 64 is facing towards the side surface of the tool 10 (relative to the face). According to this example, the position of the hook 62 itself may be fixed, and does not need to move in order to arrange the tool 10 in the open grip or closed grip positions. The section of the tool that does move for opening and/or closing the hook 62, namely sliding grip tip 46, moves parallel to the front surface of the tool. In an embodiment, the hook 62 has a groove inside of the opening 64 (e.g., surface along the width of the tool). Because of pushing the thumb slide 42, the sliding grip tip 46, which is a protruding edge, can be inserted into this groove, thus stopping its movement and closing the hook 62. In some embodiments, hook 62 can have multiple purposes. For instance, the hook 62 can be used to pull wires from the junction box, as illustrated in the example in FIG. 1. The hook 62 can also be used to grip a wire, for instance when a sliding grip tip 46 is pushed against hook 62 firmly gripping the wire in between. Aspects of the gripping function of tool 10 in operation, were previously discussed in detail about FIG. 1.

Figure 3:
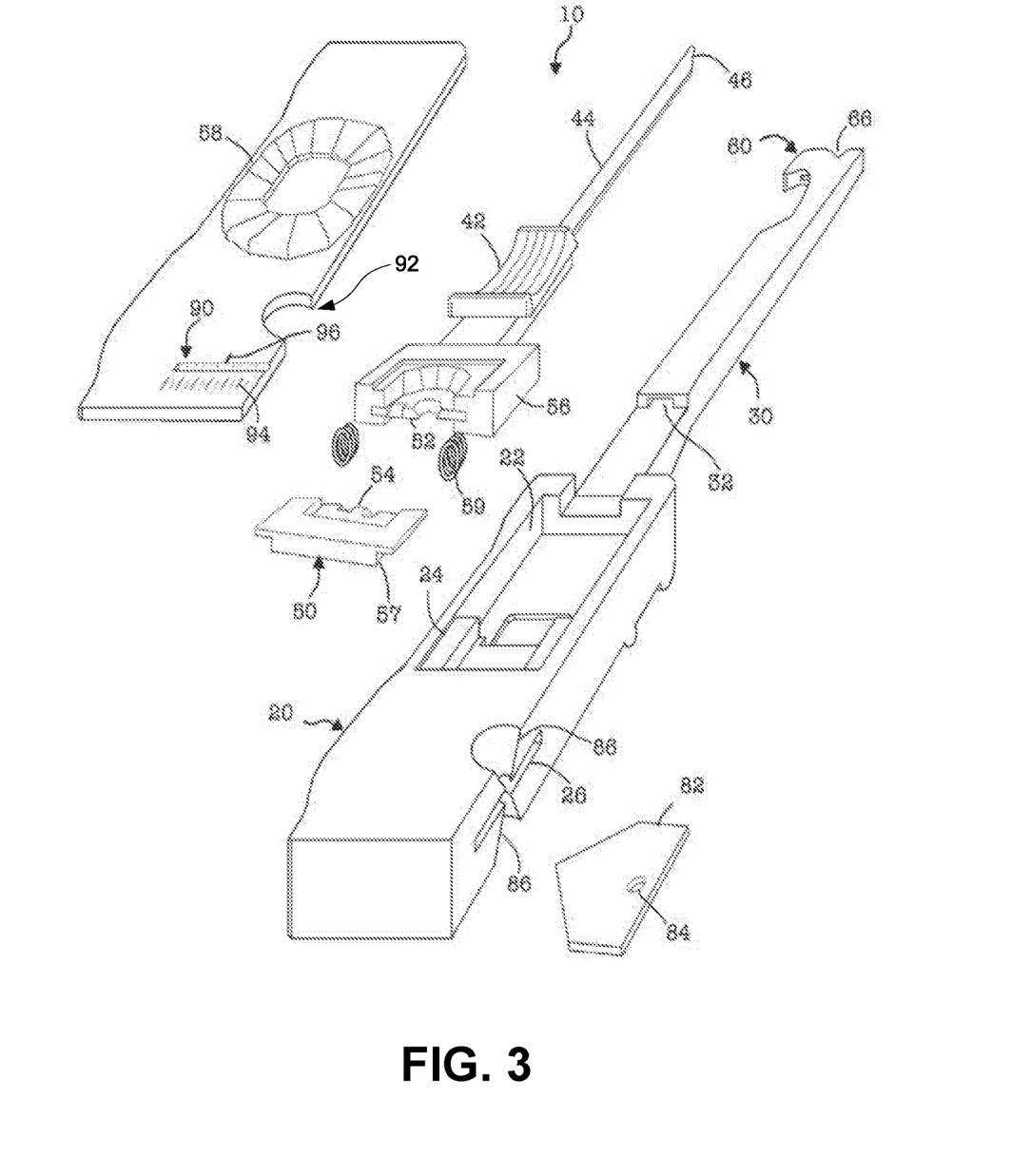
FIG. 3 is an exploded view of an example wire gripping and stripping tool illustrated in FIG. 1.

FIG. 3 is a diagram illustrating an exploded view of the example wire gripping and stripping tool 10 in FIG. 1. The view in FIG. 3 prominently shows the handle body 20 member, the elongated portion of the slide housing body 30 member, and the elements associated therewith. The main body of the tool 10 can include a body slide track 32 to serve as a channel that can accept sliding grip rod 44. In the example, sliding grip rod 44 is an elongated member, and the slide track is a flat surface of the slide housing body 30 which forms a "tunneled" opening with a raised surface. The slide sliding grip rod 44 and the body slide track 32 are arranged in a manner that allows for the grip rod 44 to be mated, or received by the slide track 32, where the sliding grip rod 44 can be slid in and out of the channel. Thus, the grip rod 44 can slide along the body slide track 32 such that the rod 44 extends and retracts with the respect to the length of the tool 10. For instance, by pressing the thumb slide 42 in a forward motion (e.g., towards the tip of the tool 10), the sliding grip rod 44 can be extended to slide closer towards the tip, or hook head 60 of the tool 10. As the tip of the sliding grip rod 44, namely sliding grip tip 46, comes into contact with the hook 62, the tool 10 can be configured in a gripper closed position allowing it to securely grip a wire within the hook 62. The sliding grip rod 44 can also be retracted back into the rear sections of the tool 10, inside of the handle body 20 for example, in a similar fashion. Retracting the sliding grip rod 44 along the body slide track 32 can be caused by pulling the thumb slide 42 back (e.g., towards the rear hook 70).

The handle body 20 can be integral with the main body member of the tool 10. In alternate embodiments, the handle body 20 can be a separate portion that is fixedly or removable attached to the main body of the tool 10. The handle body 20 can include a wire stripper 50, that is constructed as a hole in the top surface of tool 10. The hole can be an opening used to accept the wire, through the top surface, and down inside of the body of the tool 10. In the illustrated example, a portion of the surface surrounding the perimeter of the hole can be a beveled wire insertion guide 58. The beveled wire insertion guide 58 is configured in a manner to guide a wire into the hole for the wire stripper 50. The beveled wire insertion guide 58 can be generally described as a tapered section of the surface, rounded towards the insertion point of the wire stripper 50. In some cases, the surrounding edge of the insertion guide 58 is raised, in order to provide protection relating to the wire, for example preventing the wire from glancing off from the tool handle body 20, and accidentally touching a hand that may be gripping the tool 10.

The beveled wire insertion guide 58 can increase the ease of properly inserting the wire between the blades 52, 54 during wire stripping functions. In some cases, the wire insertion bevel guide 58 is additionally configured as a hand protector, preventing a human finger, for example, from accidentally contacting a sharp blade. In some embodiments, the wire can be inserted until it stops at a correct depth. According to this embodiment, a stopping mechanism can be provided to ensure that the proper length of the stripped end of the wire. In yet another embodiment, the tool 10 can be designed to have a width, or thickness, of the main body member (e.g., below the blades 52, 54) that is set to a specific depth such that when the wire is flush with a bottom of the main body member of the tool 10, the proper length of insulation is stripped from the wire.

FIG. 3 also illustrates the that example wire stripper 50 may include a front sliding blade 52, and a fixed blade 54. The sliding blade 52 is capable of movement due to being coupled to the sliding grip rod 44. In the illustrated example, the sliding blade 52 is provided at the end of the elongated member of the tool 10, as it can be connected to the sliding grip rod 44. As illustrated, the sliding blade 52 can be placed in a front sliding blade mounting structure 56 that is attached to and end of the rod 44. The sliding grip rod 44 is an element of the handle body 20 that is configured for slidable movement. For example, as the sliding grip rod 44 slides forward, the sliding blade 52 that is positioned at the end of the rod 44, in turn, slides forward along the blade track 22 and towards the fixed blade 54. In contrast, the fixed blade 52 is provided in the main body of the tool 10, predominately in the handle body 20. The fixed blade 52 is configured to remain substantially fixed, for example stably situated in a fixed blade holder 24 that is arranged within the body. The fixed blade 52 is directly mounted to a rear blade mounting structure 57, that is then placed in the fixed blade holder 24.

According to an embodiment, the dimensions of the blades 52, 54 are fixed such that the tool 100 can be used to strip wires of a given gauge. As an example, the tool 10 can be configured to strip wires particularly having 12, 14, 16 AWG respectively. Moreover, in some embodiments, the blades 52, 54 can be interchangeable, such that the tool 10 can be reconfigured for accepting and properly stripping wires of varying gauges. In further embodiments, the tool 10 can be arranged to house multiple cutting blades. For example, the tool 10 can be configured on a rotary, or slide mechanism, such that the desired gauge for stripping the wire can be selected, or otherwise chose by a user. It should be readily recognized that the wire stripper 50 and its components, such as the blades 52, 54, can have various embodiments that are specifically dimensioned, for example based on the dimensions of another electrical component or for an anticipated application.

Moreover, the handle body 20 portion of the tool 10 may include recessed wire holder 92, that is shown to be arranged near the wire stripper 50. To this end, the recessed wire holder 92 can be constructed for resting a wire, in a position near the wire stripper 50 while the wire's tip is being stripped, for example, wire measuring groove 90. Additionally, the front surface of the handle body 20 can display measurement increments 94, shown as measuring lines, presenting lengths of the wire (e.g., stripped portion, or unstripped portion) in manner that is visible to a human operating tool 10. In some embodiments, it may be preferable for the measurement increments 94 to include one or more highlighted increments 96. The highlighted increments 96 can indicate specific measurements that may correspond to an application. The highlighted increments 96 can be a dashed mark that is bolded, or raised, or otherwise made visibly more prominent than other measurements of measurement increments 94. As an example, one highlighted increment 96 can be used to demarcate a desired length, or standardize length, that preferably used for bending wires, for instance ⅝ inches.

Even further, FIG. 3 illustrates that a compression mechanism, shown as springs 59, may be present in the handle body 20. In other embodiments, the springs 59 may be replaced in the tool 10 by using other mechanical means that are capable of causing movement that returns an element to its initial position, as desired. Various embodiments can include employing plastic leaf springs, memory foam, and the like. In the illustrated example, springs 59 are situated between blade mounting structures 56, 57 to compress when the wire stripper 50 is closed, and then lengthen to readily return the respective blade 52, 54 to their open positions. The FIGS. 4A-4B serve to illustrate positioning of the blades 52, 54 as the tool 10 is arranged in a wire stripper open position, and the wire stripper closed position, respectively.

Figure 4A:
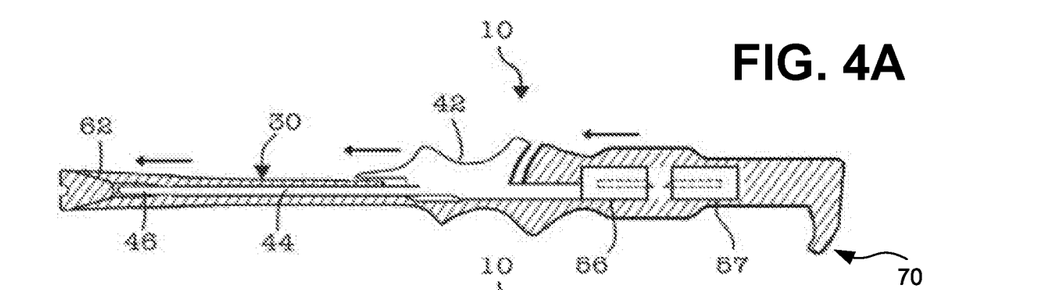
FIGS. 4A-4B are side views of an example wire gripping and stripping tool illustrated in FIG. 1, including a thumb slide and arranged in an example configuration in accordance with an embodiment of the technology described herein.
Figure 4B:
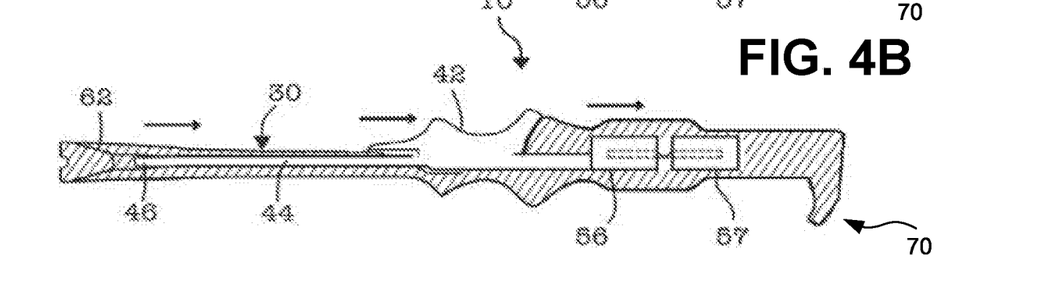

Referring now to FIG. 4A, as previously discussed, slidable movement of the thumb slide 42 in a particular direction imparts movement of the front sliding blade sliding structure 56 at one end of the tool 10, and the sliding grip tip 46 at the opposing end of the tool 10. FIG. 4A, in detail, illustrates that sliding the thumb slide 42 forward (indicated by arrows) towards the hook 62, arranges the tip 46 such that the tool 10 is in a gripper closed configuration (e.g., gripping a wire), while simultaneously sliding the structure 56 such that the tool 10 is in a stripper open configuration (e.g., releasing a wire). Alternatively, FIG. 4B illustrates that sliding the thumb slide 42 in an opposite direction (indicated by arrows), which is backwards towards the rear hook 70, arranges the tip 46 such that the tool is in a gripper open configuration (e.g., releasing a wire), and the structure 56 is in a stripper closed configuration (e.g., stripping a wire).

Figure 4C:
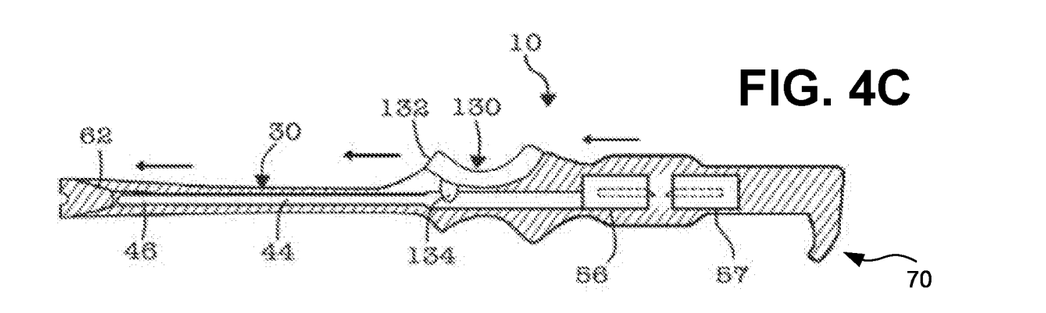
FIGS. 4C-4D are side views of another example wire gripping and stripping tool, including a pivoting thumb slide and arranged in an example configuration in accordance with an embodiment of the technology described herein.
Figure 4D:
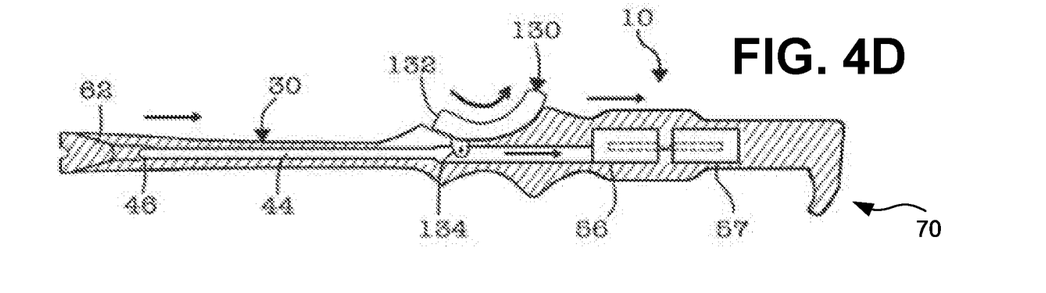

Although a thumb slide 42 is discussed in referring to the previous examples, it should be appreciated that a closing mechanism that imparts the described slidable movement in the tool 10 can be implemented using various mechanical means. FIGS. 4C-4D illustrate another example wire gripping stripping tool 10, including a pivoting thumb slide 132 implementation of the closing mechanism. As a general description, the pivoting thumb slide 132 can be movably connected to the sliding grip rod 44 with a hinged pin 134. In some cases, other mechanisms, such as a bendable piece of plastic, can be used to connect the pivoting thumb slide 132. The pivoting thumb slide 132 is hinged to the rod 44, in a manner that allows the pivoting thumb slide 132 to slidably move within a radiused direction. The pivoting thumb slide 132 pivots with respect to the direction in which the pivoting thumb slide 132 is pushed (indicated by arrows). FIG. 4C particularly illustrates an example, where sliding the pivoting thumb-slide 132 forward (e.g., towards hook 62), causes the slide 132 to pivot forwards, or clockwise, in a like manner. Due to the forward movement, the front of the pivoting thumb slide 132 pushes the rod 44 towards the tip of the tool 10. Accordingly, the illustrated movement of the pivoting thumb slide 132 in FIG. 4C arranges the tool 10 in a gripper closed configuration (e.g., gripping a wire), while it is simultaneously in a stripper open configuration (e.g., releasing a wire).

FIG. 4D shows that moving the pivoting thumb slide 132 in the opposite direction (indicated by arrows), causes the rear of the pivoting thumb slide 132 to push the rod 44 towards the fixed rear blade mounting structure 57 (e.g., towards the rear hook 70). FIG. 4D shows the tool 10 arranged in a gripper open configuration (e.g., releasing a wire), and a stripper closed configuration (e.g., stripping the wire), with respect to pulling the pivoting thumb slide 132 in an opposing direction (e.g., counter-clockwise) relative to the configuration in FIG. 4C.

Figure 5:
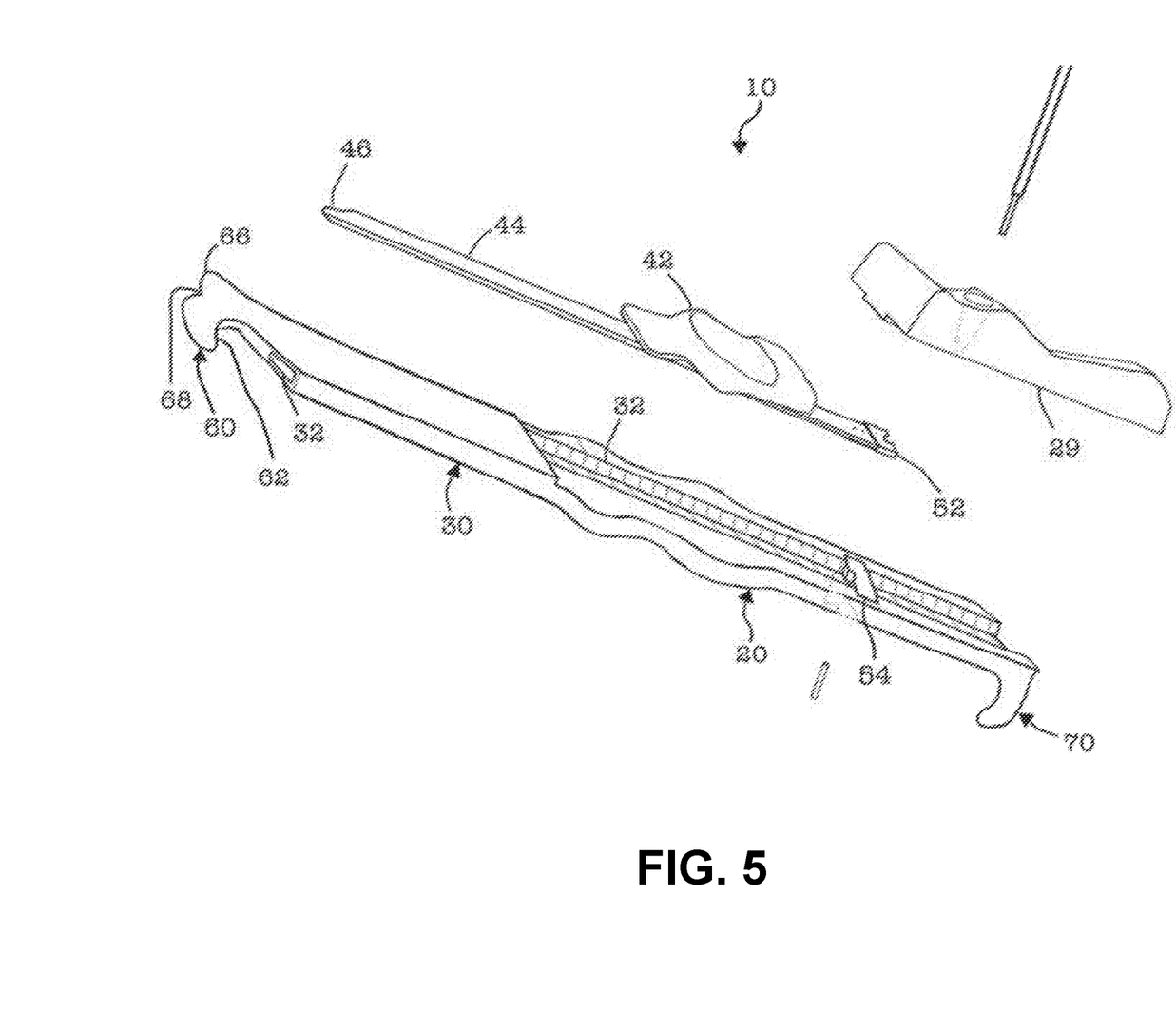
FIG. 5 is another exploded view of an example wire gripping and stripping tool illustrated in FIG. 1.

FIG. 5 is a diagram illustrating another exploded view of the example wire gripping and stripping tool shown in FIG. 1. FIG. 5 further illustrates that the sliding blade 52 may be capable of slidable movement, as it is mounted to other movable elements of the tool 10. As shown, the sliding blade 52 is coupled to sliding grip rod 44, and resultantly coupled to thumb slide 42. However, the fixed blade 54 is mounted in a fixed position, as it coupled with a fixed member of the tool 10. FIG. 5 shows the fixed blade 54 as being coupled to handle body 20, which is also the main body of the tool 10. Also, FIG. 5 illustrates a top cover 29. In some cases, the top cover 29 is a protective shield that can cover the elements arranged inside of the handle body 20, for instance preventing blades 52, 54 from being exposed and potentially causing harm.

Figure 7:
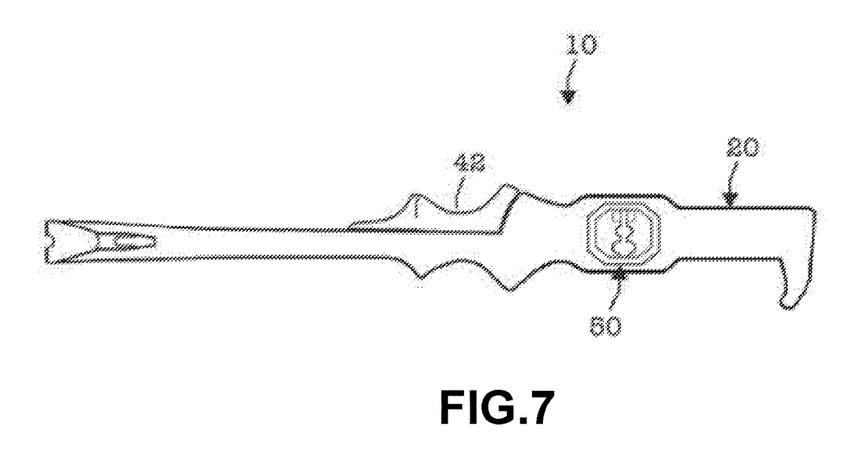
FIG. 7 is a side view of another example wire gripping and stripping tool in accordance with an embodiment of the technology described herein.

In some embodiments, elements of the tool 10 can be arranged in various configurations, as deemed necessary and/or appropriate. FIG. 7 shows another example wire gripping and stripping tool 10, including the wire stripper 50 mounted on the side of the tool 10, rather than the front surface (as shown in FIG. 1). In the illustrated example, the wire stripper 50 is arranged in a lateral surface of the tool 10, relative to the thumb slide 42. It should be readily recognized that the arrangement of elements on the tool 10, such as the wire stripper 50, can have various embodiments that are specifically dimensioned and/or configured for an intended purpose, for example based on the dimensions of another electrical component or for an anticipated application.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A wire gripping and stripping tool comprising:
a body, wherein the body comprises a first portion having a curved tip, and a second portion;
a closing movable part mounted on the body;
an elongated member having a protruding tip and coupled to the closing movable part, wherein
the elongated member slidably moves towards the second portion, causing the protruding tip to move away from to the curved tip, with respect to movement of the closing movable part to increase an opening of the curved tip for receiving at least a portion of an electrical wire inserted into the opening, and
the elongated member slidably moves towards the first portion, causing the protruding tip to move toward the curved tip, with respect to another movement of the closing movable part to decrease the opening of the curved tip for gripping the received portion of the electrical wire; and
a cutting blade coupled to the elongated member, wherein the cutting blade slidably moves towards the second portion with respect to the movement of the closing movable part to decrease a space between the cutting blade and a fixed cutting blade to cut through an additional portion of the electrical wire.

2. The wire gripping and stripping tool of claim 1, further comprising an opening in a surface of the second portion, wherein the opening is dimensioned to insert the additional portion of the electrical wire in the space between the cutting blade and the fixed cutting blade.

3. The wire gripping and stripping tool of claim 2, wherein the cutting blade and the fixed cutting blade cut through the additional portion of the electrical wire to a depth comprising a width of the insulation layer.

4. The wire gripping and stripping tool of claim 3, wherein the cutting blade and the fixed cutting blade further cut through the additional portion of the electrical wire to a depth comprising the width of the electrical wire.

5. The wire gripping and stripping tool of claim 2, wherein the cutting blade and the fixed cutting blade cut through the additional portion of the electrical wire to a depth comprising the width of the electrical wire.

6. The wire gripping and stripping tool of claim 1, wherein the second portion comprises an additional curved tip having a radius larger than a radius of the curved tip of the first portion.

7. The wire gripping and stripping tool of claim 1, wherein the body comprises an internal groove for receiving the elongated member that slidably moves towards the second portion with respect to the movement of the closing mechanism.

8. The wire gripping and stripping tool of claim 1, wherein the body comprises an internal groove for receiving the elongated member that slidably moves towards the first portion with respect to the movement of the closing mechanism.

9. The wire gripping and stripping tool of claim 1, wherein the second portion comprises a metal plate that receives at least an additional portion of the electrical wire, and firmly contacts the additional portion of the electrical wire to cause bending in a direction with respect to a rotational movement of the tool.

10. The wire gripping and stripping tool of claim 1, wherein the closing movable part comprises a thumb slide or a thumb pivot slide.

11. A wire gripping and stripping tool comprising:
a body, wherein the body comprises a first portion having a curved tip, and a second portion;
a thumb slide mounted on the body;
an elongated member having a protruding tip and coupled to the thumb slide, wherein the elongated member slidably moves towards the second portion, causing the protruding tip to move away from to the curved tip, with respect to movement of the thumb slide to increase an opening of the curved tip for receiving at least a portion of an electrical wire inserted into the opening, and the elongated member slidably moves towards the first portion, causing the protruding tip to move toward the curved tip, with respect to another movement of the thumb slide to decrease the opening of the curved tip for gripping the received portion of the electrical wire; and a cutting blade coupled to the elongated member, wherein the cutting blade slidably moves towards the second portion with respect to the movement of the closing mechanism to decrease a space between the cutting blade and a fixed cutting blade to cut through an additional portion of the electrical wire.

* * * * *